United States Patent
Pack et al.

(10) Patent No.: US 12,446,587 B2
(45) Date of Patent: Oct. 21, 2025

(54) SYSTEM AND METHOD FOR PLACING TOPPINGS ON A PRODUCT

(71) Applicant: Burford Corp., Maysville, OK (US)

(72) Inventors: Jerry Pack, Purcell, OK (US); Scott Clemons, Blanchard, OK (US)

(73) Assignee: BURFORD CORP., Maysville, OK (US)

( * ) Notice: Subject to any disclaimer, the term of this patent is extended or adjusted under 35 U.S.C. 154(b) by 308 days.

(21) Appl. No.: 18/266,989

(22) PCT Filed: Dec. 10, 2021

(86) PCT No.: PCT/US2021/062881
§ 371 (c)(1),
(2) Date: Jun. 13, 2023

(87) PCT Pub. No.: WO2022/140083
PCT Pub. Date: Jun. 30, 2022

(65) Prior Publication Data
US 2024/0081346 A1 Mar. 14, 2024

Related U.S. Application Data

(60) Provisional application No. 63/128,553, filed on Dec. 21, 2020.

(51) Int. Cl.
*A21C 9/04* (2006.01)
*A21D 13/22* (2017.01)

(52) U.S. Cl.
CPC ............... *A21C 9/04* (2013.01); *A21D 13/22* (2017.01)

(58) Field of Classification Search
CPC ......... A21C 15/002; A21C 9/04; A23P 20/12; A23P 20/13; A23G 3/2076; A23G 3/26; G01F 11/24; A21D 13/22
See application file for complete search history.

(56) References Cited

U.S. PATENT DOCUMENTS

| | | | | |
|---|---|---|---|---|
| 874,570 | A | * 12/1907 | Cairncross | A23G 3/2076 118/308 |
| 2,897,776 | A | * 8/1959 | Black | A47J 37/047 99/421 H |
| 3,147,144 | A | * 9/1964 | Wilhelm | B29C 37/0071 118/308 |

(Continued)

FOREIGN PATENT DOCUMENTS

GB  1 410 880 A  10/1975

OTHER PUBLICATIONS

International Search Report and Written Opinion from corresponding International Application No. PCT/US2021/062881, May 20, 2022, 21 pp.

*Primary Examiner* — Dariush Seif
(74) *Attorney, Agent, or Firm* — Crowell & Moring LLP

(57) ABSTRACT

Systems and methods are provided for placing toppings on a product. In one embodiment, a system comprises a mandrel configured to dispense toppings from a supply hopper, and a topping distributor disposed least partly downstream to the mandrel. The topping distributor comprising at least one opening, wherein at least some of the toppings that fail to exit through the at least one opening of the topping distributor are directed into a reclaim hopper. In one example, the topping distributor comprises at least one rotating drum that encircles the mandrel.

20 Claims, 7 Drawing Sheets

(56) References Cited

U.S. PATENT DOCUMENTS

| | | | | |
|---|---|---|---|---|
| 3,283,740 A * | 11/1966 | Fredricksen | A23G 3/2076 | 118/308 |
| 3,381,658 A * | 5/1968 | Porambo | A23G 3/2076 | 118/19 |
| 3,767,089 A * | 10/1973 | McKee | A21C 9/04 | 222/221 |
| 3,890,923 A * | 6/1975 | Dumoulin | A23G 3/26 | 118/19 |
| 3,934,545 A * | 1/1976 | Schady | A23G 3/26 | 118/19 |
| 4,045,584 A * | 8/1977 | Jones | A21C 9/04 | 426/292 |
| 4,293,296 A * | 10/1981 | Caiello | A21C 9/04 | 249/176 |
| 4,511,067 A * | 4/1985 | Martin | G01F 11/24 | 222/230 |
| 4,543,907 A * | 10/1985 | Fowler | B05C 19/00 | 118/19 |
| 4,566,506 A * | 1/1986 | Cramer | A47J 27/14 | 141/160 |
| 4,608,261 A * | 8/1986 | MacKenzie | H05B 6/782 | 426/445 |
| 4,611,555 A * | 9/1986 | Burford | A21C 15/002 | 222/274 |
| 4,614,162 A * | 9/1986 | Ryan | A23P 20/13 | 118/19 |
| 4,666,069 A * | 5/1987 | Morine | G01F 11/24 | 222/452 |
| 4,715,315 A * | 12/1987 | Burford | A21C 15/002 | 222/274 |
| 4,762,083 A * | 8/1988 | Wadell | A23P 20/12 | 118/18 |
| 4,851,248 A * | 7/1989 | Simelunas | A23G 3/2076 | 426/291 |
| 4,936,248 A * | 6/1990 | Miller | A23P 20/12 | 118/24 |
| 5,090,593 A * | 2/1992 | Ejike | A23P 20/13 | 118/19 |
| 5,195,454 A * | 3/1993 | Wadell | B05C 19/06 | 366/38 |
| 5,287,801 A * | 2/1994 | Clark | B05B 13/025 | 222/311 |
| 5,353,994 A * | 10/1994 | Clark | A23P 20/13 | 239/689 |
| 5,386,939 A * | 2/1995 | Ruegg | A23P 20/13 | 239/689 |
| 5,647,905 A * | 7/1997 | Bertrand | A23G 9/245 | 118/18 |
| 5,664,489 A * | 9/1997 | Herrick, IV | A23P 20/13 | 118/19 |
| 5,846,324 A * | 12/1998 | Marshall | A23B 7/159 | 118/19 |
| 5,927,908 A * | 7/1999 | Kikuchi | A21C 9/04 | 406/129 |
| 5,937,744 A * | 8/1999 | Nothum, Sr. | A23L 13/03 | 118/18 |
| 6,152,310 A * | 11/2000 | Sakai | A21C 9/04 | 222/64 |
| 6,403,132 B1 * | 6/2002 | Capodieci | A23L 7/126 | 426/512 |
| 6,619,226 B2 * | 9/2003 | Rooke | A23P 20/12 | 118/308 |
| 6,962,128 B2 * | 11/2005 | Dove | A23L 7/117 | 118/308 |
| 7,464,661 B2 * | 12/2008 | Baas | A23P 20/13 | 118/19 |
| 7,748,575 B2 * | 7/2010 | Hanaoka | G01F 13/005 | 222/413 |
| 7,975,642 B2 * | 7/2011 | Rudesill | A23P 20/10 | 118/308 |
| 9,028,239 B2 * | 5/2015 | Van Gerwen | A22C 7/0069 | 425/197 |
| 9,635,880 B2 * | 5/2017 | Bakos | A23P 20/12 | |
| 2002/0046696 A1 * | 4/2002 | Lang | A21C 15/002 | 118/13 |
| 2007/0237893 A1 * | 10/2007 | Moore | A23G 3/0095 | 427/299 |
| 2008/0014310 A1 * | 1/2008 | Dargusch | A23P 20/12 | 426/295 |
| 2009/0031946 A1 * | 2/2009 | Alverde Trejo | A23G 3/28 | 118/25 |
| 2009/0123616 A1 * | 5/2009 | Karpinsky | A21C 9/04 | 118/57 |
| 2010/0021597 A1 * | 1/2010 | Bakos | A21C 15/002 | 426/292 |
| 2012/0305592 A1 * | 12/2012 | Villarreal | A23L 27/00 | 222/1 |
| 2015/0128852 A1 * | 5/2015 | Sarajian | A21C 9/04 | 118/17 |
| 2016/0316792 A1 * | 11/2016 | Schneider | A21D 13/22 | |
| 2017/0112148 A1 * | 4/2017 | Mackey | A21C 9/04 | |
| 2020/0298271 A1 * | 9/2020 | Dong | B05D 3/148 | |
| 2020/0305494 A1 * | 10/2020 | Tubic | A23P 20/12 | |
| 2020/0359596 A1 * | 11/2020 | Jagan | B01J 2/006 | |
| 2024/0081346 A1 * | 3/2024 | Pack | A23P 20/12 | |

\* cited by examiner

US 12,446,587 B2

SYSTEM AND METHOD FOR PLACING TOPPINGS ON A PRODUCT

RELATED APPLICATIONS

The present patent document is a § 371 filing based on PCT Application Serial No. PCT/US2021/062881, filed Dec. 10, 2021 (and published as WO 2022/140083 A1 on Jun. 30, 2022), designating the United States and published in English, which claims the benefit of the filing date under 35 U.S.C. § 119 (e) of U.S. Provisional Patent Application Ser. No. 63/128,553, filed Dec. 21, 2020. All of the foregoing applications are hereby incorporated by reference in their entirety.

BACKGROUND

The present embodiments relate generally to systems and methods for improved placement of toppings on a product, such as a food product.

Food preparation entities, such as commercial bakeries, often utilize assembly line production to prepare and bake products. In many cases, baked goods are prepared by placing pans onto the assembly line, loading dough into the pans, and moving the pans and dough through preparation, cooking and packaging processes. Commercial baking pans often include multiple rows of molds used to hold the dough.

For some products, it may be desirable to apply toppings or coatings to the dough before it is cooked. Toppings may include, for example, seeds, spices, sugar, fruits, or other particulates.

In some prior systems, the toppings are dispensed through a mandrel with exit slots laterally spaced apart along the width of a conveyor belt of the assembly line. The toppings are typically in a square or rectangular shape due to the exit slots of the mandrel being laterally disposed relative to each other.

In some situations, there may be a considerable waste of toppings where, for example, the product passing beneath the mandrel is a non-square or non-rectangular shape, such as a circular shape. In this case, a substantial amount of toppings may land on the baking pan outside of the molds holding the dough. Such misplaced toppings are effectively wasted, as they cannot be reclaimed in a sanitary way. The substantial amount of toppings that are misdirected relative to the food product will consequently result in wasted material and lost revenue during the manufacturing process.

The present embodiments enable improved placement of toppings on products, in a manner that facilitates the recapture and recycling of toppings that may not have been directed onto the product.

SUMMARY

Systems and methods are provided for placing toppings on a product. In one embodiment, a system comprises a mandrel configured to dispense toppings from a supply hopper, and a topping distributor disposed at least partly downstream to the mandrel. The topping distributor comprising at least one opening, wherein at least some of the toppings that fail to exit through the at least one opening of the topping distributor are directed into a reclaim hopper.

In one example, the topping distributor comprises at least one rotating drum that encircles the mandrel. The drum may comprise at least one interior-facing protrusion dimensioned to catch toppings that fail to exit through the at least one opening, wherein upon rotation of the drum the at least one interior-facing protrusion directs the toppings into the reclaim hopper. The at least one interior-facing protrusion may comprise one of an inwardly extending lip surrounding the opening, inward ledges extending from opposing sides of the opening towards the lateral boundaries of the drum, or a lateral ledge formed circumferentially in-between adjacent openings of the drum.

In one embodiment, the at least one opening of the drum may comprise an elliptical shape. The drum may be configured to rotate at a first speed when a first mold comprises a first dimension, and the drum may be configured to rotate at a second speed when a different mold comprises a second dimension different than the first dimension.

In one example, a frame is dimensioned to holds multiple adjacent drums, wherein driven rotation of the frame causes rotation of each of the adjacent drums.

In one embodiment, the reclaim hopper is in communication with the supply hopper, such that the toppings that fail to exit through the at least one opening travel from the reclaim hopper back to the supply hopper. The system may comprise first and second auger systems, where the first auger system directs toppings from the supply hopper to the mandrel, and the second auger system directs toppings from the reclaim hopper to the supply hopper.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
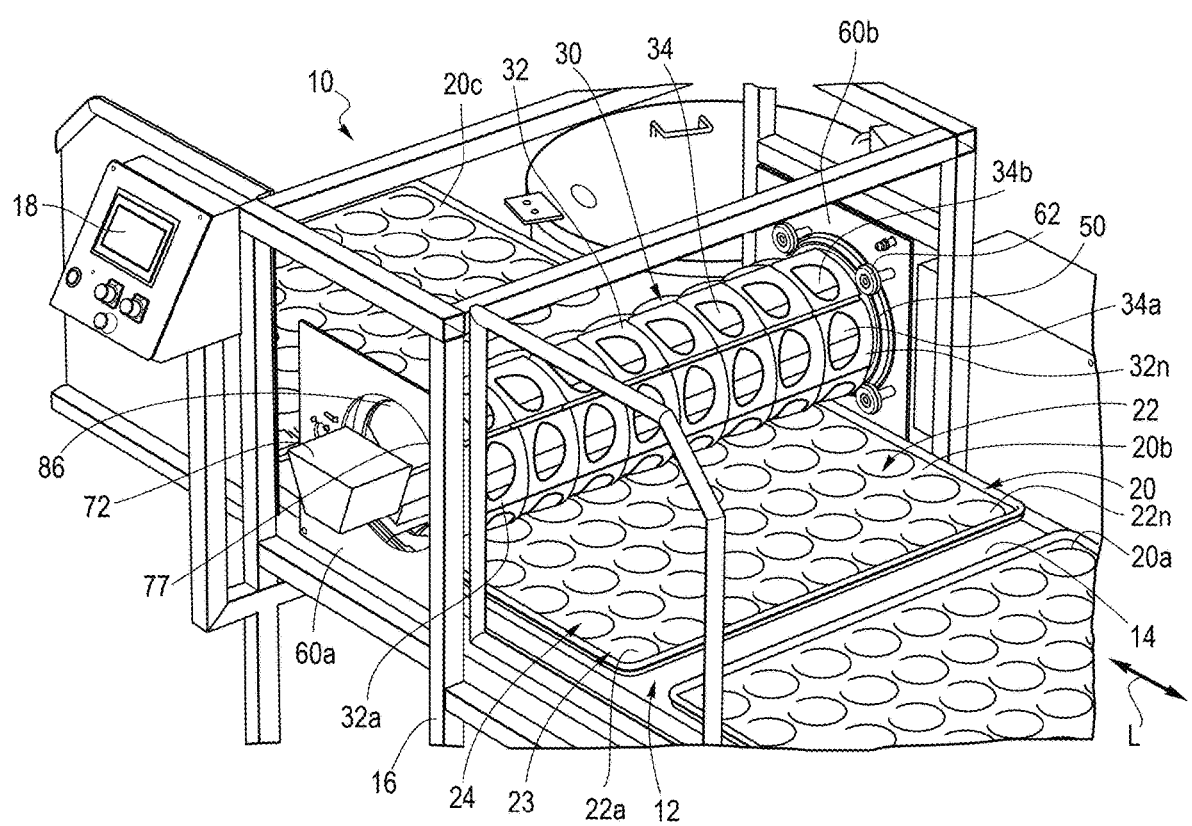
FIG. 1 is a perspective view of a system for improved placement of toppings on a product in accordance with a first embodiment.

Referring to FIG. 1, a first embodiment of a system 10 for improved placement of toppings on a product is shown and described. The system 10 comprises a conveyor assembly 12 having a conveyor belt 14, which may be supported by various segments of a frame structure 16. The conveyor belt 14 carries at least one pan 20 along a primary longitudinal axis L, as depicted in FIG. 1. In some applications, multiple pans may be used in series, such as exemplary pans 20a, 20b and 20c, as shown in FIG. 1.

The one or more pans 20 may comprise a plurality of molds 22 for holding a food product. In one non-limiting example, the food product in the molds 22 may comprise dough, although it will be appreciated that other food products may be used. In the example of FIG. 1, each pan 20 is depicted as having a first row 23 comprising a plurality of molds 22a through 22n across the first row 23, where "n" in this example represents eight molds in the row. Each pan 20 further comprises a second row 24, which also has a plurality of molds 22a through 22n across the second row 24. Additional rows of molds 22 in the pan 20 may be provided, as shown in FIG. 1, and while they are not discussed further for brevity, they may comprise the same characteristics as the molds 22a through 22n of the first and second rows 23 and 24.

In the example of FIG. 1, each of the molds 22 comprises a circular shape, which may correspond to a food product of such circular shape. It may be desirable to apply a topping to the food product held in the molds 22 in a substantially circular shape, e.g., across the upper circular surface of the food product.

The system 10 comprises a topping distributor 30, which facilitates targeted application of toppings onto the food product held in the molds 22 of the pan 20. In one embodiment, the topping distributor 30 comprises at least one rotating drum 32 having at least two spaced-apart circumferential openings 34, as depicted in FIG. 1 and explained in further detail below. In use, the system 10 employs programmable logic to align the openings 34 of the drum 32 with the molds 22 in the pan 20 containing the food product. In effect, the drum 32 acts as a mask to ensure that toppings exiting its openings land primarily on the food product beneath it, as explained below.

Figure 2:
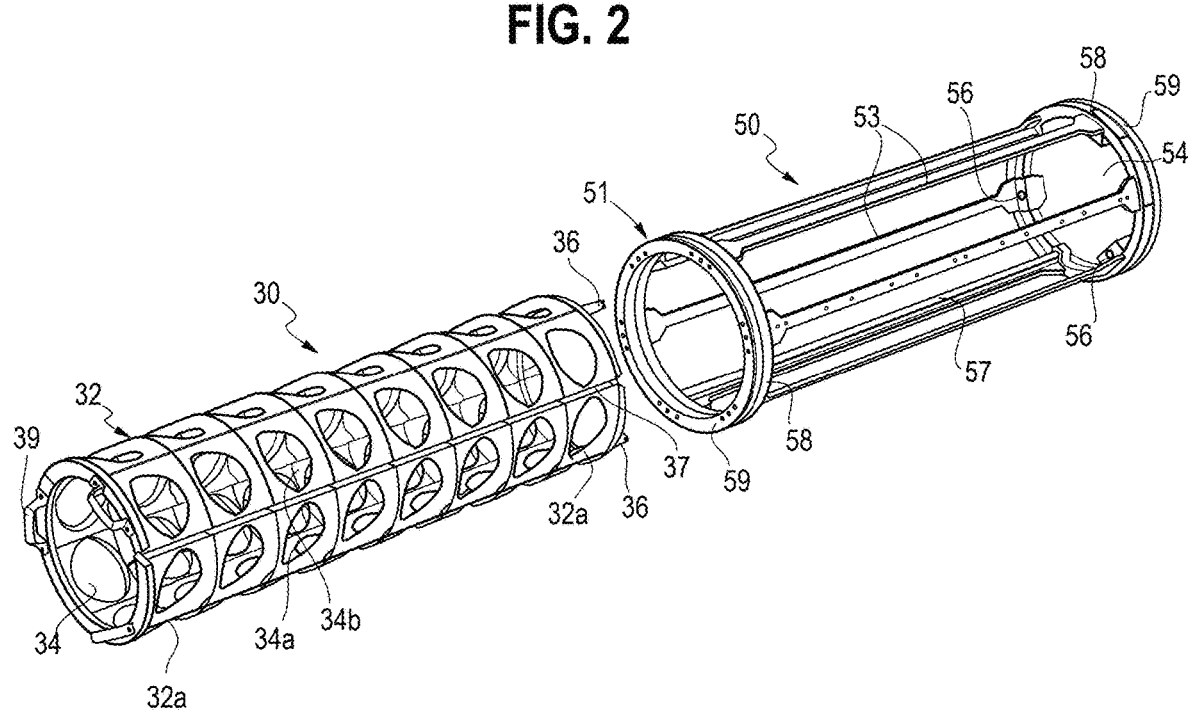
FIG. 2 is a perspective view showing a topping distributor comprising a plurality of drums outside of a frame within which the drums may be secured.

In the example of FIGS. 1-2, the topping distributor 30 comprises a plurality of rotating drums 32 disposed in an adjacent manner, substantially along the width of the conveyor belt 14. The plurality of rotating drums are labeled 32a through 32n for references purposes. Their features may be identical, and therefore, reference to only one rotating drum 32 may be made but can apply to the other drums 32. In one example, the number of drums "n" (across part or all of the width of the conveyor belt 14) may correspond to the number of molds "n" across the lateral width of the pan 20. In this manner, the rotating drum 32a can facilitate accurate placement of the toppings being dispensed on food product in the mold 22a, while the rotating drum 32n can facilitate accurate placement of the toppings being dispensed on food product in the mold 22n, such that there is a one-to-one correspondence of drums 32 to molds 22 along the width of a single row. It should be noted that the number of openings 34 around the perimeter of each drum 32 (in this non-limiting example, six openings 34 in each drum) does not need to match the number of rows in each pan (i.e., rows 23, 24 and more unlabeled rows along axis L of the system, up to any desirable number of rows, need not match the number of drum openings).

Further, each of the rotating drums 32 comprises a first opening 34a that facilitates accurate placement of the toppings being dispensed on food product in a mold 22 of a first row 23 of the pan 20, while a second opening 34b of the same rotating drum 32 facilitates accurate placement of the toppings being dispensed on food product in a mold 22 of a second row 24 of the pan 20. In this manner, the openings 34 around the perimeter of each drum 32 supply toppings to molds that are aligned in different rows, as will be explained in further detail below.

In the example of FIGS. 3-4 and 6-8, it is noted that only one rotating drum 32 is shown for demonstration purposes. It should be appreciated that the topping distributor 30 may comprise any number of rotating drums 32, including only one drum as depicted in FIGS. 3-4 and 6-8, although in a commercial bakery setting it is expected that a plurality of adjacent rotating drums 32a through 32n may be used to simultaneously dispense toppings towards a plurality of molds 22a-22n extending along the same row of a pan 20.

Referring now to FIG. 2, further features of the topping distributor 30 are shown and described, where the rotating drums 32 of the topping distributor 30 are depicted as being removed from a frame 50 while in a non-assembled state. In this example, the frame 50 comprises a first cylindrical support 51 spaced apart in a lateral direction from a second cylindrical support 52. A plurality of struts 53 may extend laterally between the first and second cylindrical supports 51 and 52, and the struts 53 are secured to the cylindrical supports 51 and 52, as depicted in FIG. 2. The plurality of struts 53 may be spaced-apart from one another around the circumference of the frame 50, and there may be a correspondence between the number of struts 53 with the number of openings 34 in the drums 32, such that one opening 34 of each drum 32 is positioned circumferentially between adjacent struts 53, as depicted in FIGS. 1-2.

During assembly, the plurality of drums 32 may be inserted into an interior space 54 formed between the boundaries of the first and second cylindrical supports 51 and 52 and the plurality of struts 53. In one embodiment, the plurality of drums 32 comprise an outer diameter that approximates an inner diameter of the space 54 between the plurality of struts 53. In this manner, the plurality of drums 32 may be inserted into the interior space 54 and held tightly within the frame 50.

In the example of FIG. 2, the frame 50 comprises at least one engaging structure that secures the rotational orientation of the drums 32 relative to the frame 50. In one non-limiting example, the engaging structure may comprise a recessed block 56 positioned near the second cylindrical support 52, which is configured to securely engage a protrusion 36 extending from the drums 32, thereby ensuring that the frame 50 and the drums 32 rotate in tandem. Additionally, or alternatively, the engaging structure may comprise an inwardly-extending strut segment 57, positioned radially inward of one or more selected struts 53, which is configured to be disposed within a recess 37 formed in the outer perimeter of the drums 32, thereby facilitating rotation of the frame 50 and the drum 32 in tandem. In one example, the recessed blocks 56 and the inwardly-extending strut segments 57 are positioned at alternating struts 53, and similarly the protrusions 36 and recesses 37 alternate around the perimeter of the drums 32, as depicted in FIG. 2, although it will be appreciated that either engaging structure may be omitted or positioned at different locations without departing from the spirit of the present embodiments.

In one embodiment, the rotating drums 32a through 32n may be inserted into the interior space 54 of the frame 50 one at a time, and then secured laterally adjacent to each other once within the interior space 54. Alternatively, multiple rotating drums 32a through 32n may be secured together before insertion into the interior space 54 of the frame 50, such that multiple drums 32 are inserted as a unit. A handle arrangement 39, as depicted in FIG. 2, may be provided on a drum segment closest to a user to facilitate placement of the drums 32.

The frame 50 may comprise one or more driven elements 58, which in this non-limiting example are disposed on a perimeter of one or both of the cylindrical supports 51 and 52. The driven elements 58 may be configured to receive an actuation mechanism such as a belt, chain, gear or similar actuator, which translates rotational movement of an upstream motor into a predetermined rotational movement of the frame 50, and consequently the drums 32 that are rotationally secured relative to the frame 50. As one non-limiting example shown in FIG. 4, a rotating member 65 with outer teeth may be driven by a motor, and the rotating member 65 in turn drives the movement of a belt 66, where the belt 66 in turn is disposed around the driven element 58 of the cylindrical support 52, thereby imparting a circumferential movement to the cylindrical support 52.

The system 10 may comprise at least one support structure 60 that supports one or more ends 59 of the frame 50. In the example of FIG. 1, two support structure 60a and 60b are provided, generally at opposing lateral sides of the conveyor belt 14. The support structures 60a and 60b may facilitate suspension of the frame 50, and in turn the drums 32, above the pans 20 moving along the conveyor belt 14, as depicted in FIG. 1. The ends 59 of the frame 50 may be coupled to the support structures 60a and 60b in a direct or indirect manner, and in a removable or fixed manner. One or more drive elements, such as the rotating member 65 of FIG. 4, may be coupled to the front or rear side of the support structure 60, in order to facilitate routing of components that enable rotational operation of the frame 50.

Figure 4:
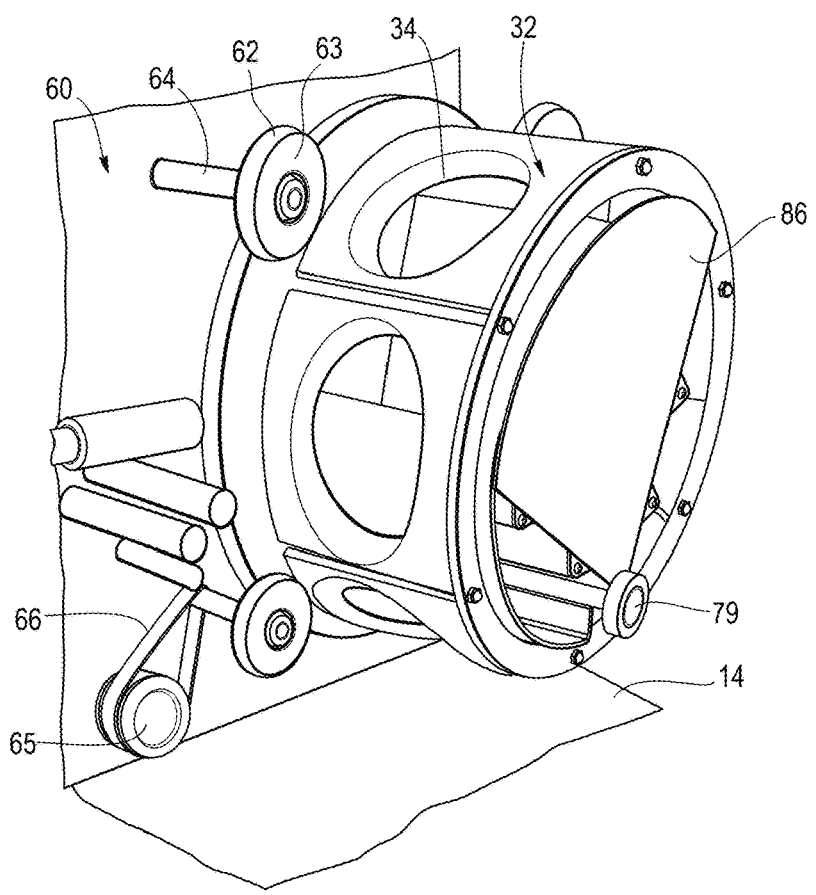
FIG. 4 is a perspective view of a single drum disposed around a reclaim hopper.

Additionally, one or more guides 62 may extend inwardly from the support structure 60, as depicted in FIG. 1 and FIG. 4. The one or more guides 62 may comprise a wheel 63 rotatable about an axis 64, as shown in FIG. 4. The wheel 63 may be positioned adjacent to a boundary of the drums 32, to help support or guide movement of the drums 32, or generally to provide added stability during operation. In the non-limiting example of FIGS. 1 and 4, four wheels 63 are positioned at spaced-apart locations around the perimeter of the drum 32 closest to the support structure 60.

Figure 3:
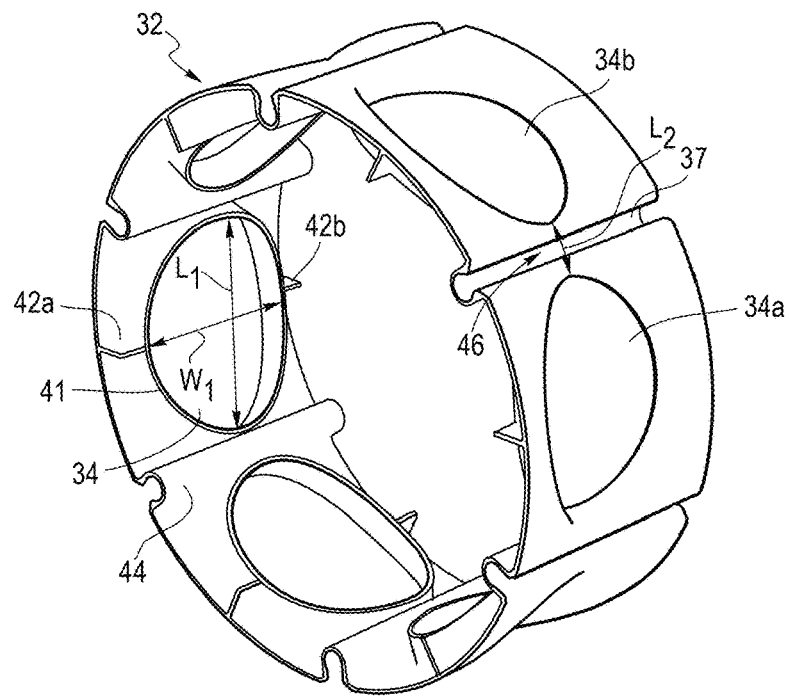
FIG. 3 is a perspective view of a single drum in isolation.

Referring to FIG. 3, further details of an exemplary drum 32 are shown and described. The drum 32 comprises at least two spaced-apart circumferential openings 34, with openings 34a and 34b being labeled for illustrative purposes. Although the non-limiting example of FIG. 3 shows six openings 34, it will be appreciated that greater or fewer openings may be provided, and the selected number may be influenced in part by factors such as the type of the topping being dispensed, the dimensions of the mold 22 or food product therein, and other variables. In one embodiment, between about two to twelve openings 34 are disposed around the perimeter of the drum 32. Notably, solid regions 46 disposed between openings 34 may comprises a length $L_2$, depicted in FIG. 3, which may generally correspond to solid regions between molds 22 along the axial length of the pan 20, i.e., axial regions between rows where toppings are not intended to be dispensed.

In this example, the openings 34 of the drum 32 comprise a generally elliptical shape, where a length $L_1$ of each opening 34 is greater than a width $W_1$ of the opening 34, as depicted in FIG. 3. Through extensive experimental testing, the inventors have identified advantages to openings 34 that are elliptical in shape, as opposed to circular in shape, even when the food product in a mold 22 of the pan 20 are circular in shape. Such advantages are explained further below.

As further shown in FIG. 3, the drum 32 may comprise one or more inwardly-extending lips, bars, ledges or other structures that can facilitate reclamation of toppings that are not dispensed through the openings 34. For example, in one embodiment, the drum 32 may comprise an inwardly extending lip 41 surrounding the opening 34, as shown in FIG. 3. Additionally, inward ledges 42a and 42b may extend from opposing sides of the opening 34 towards the lateral boundaries of the drum 32, as shown in FIG. 3.

Still further, a lateral ledge 44 may be formed circumferentially in-between adjacent openings 34a and 34b, as shown in FIG. 3. Such lateral ledges 44 may extend partially or entirely across the width of the drum 32. In one embodiment, the lateral ledges 44 may be formed from inward protrusions arising from the recesses 37 formed in the outer perimeter of the drum 32, explained above in reference to FIG. 2. Alternatively, the lateral ledges 44 may be provided independently from the recesses 37.

In accordance with one aspect, any of the lips 41, the ledges 42a and 42b, and the ledges 44 of the drum 32 may facilitate recapture of toppings that are not dispensed through the openings 34. In particular, toppings caught inside of the drum 32 (which fail to exit through the openings 34) may be carried circumferentially upward by the lips and ledges 41, 42 and 44 of the drum 32, and ultimately are dropped by gravity back inside of a reclaim hopper 86, as explained further in FIG. 5 below. This allows for "recycling" and later use of the toppings with less waste. Moreover, the recycling of toppings occurs in a sanitary manner, e.g., because the toppings do not touch the pan, or mix with oils or other products, as will be explained further below.

Figure 5:
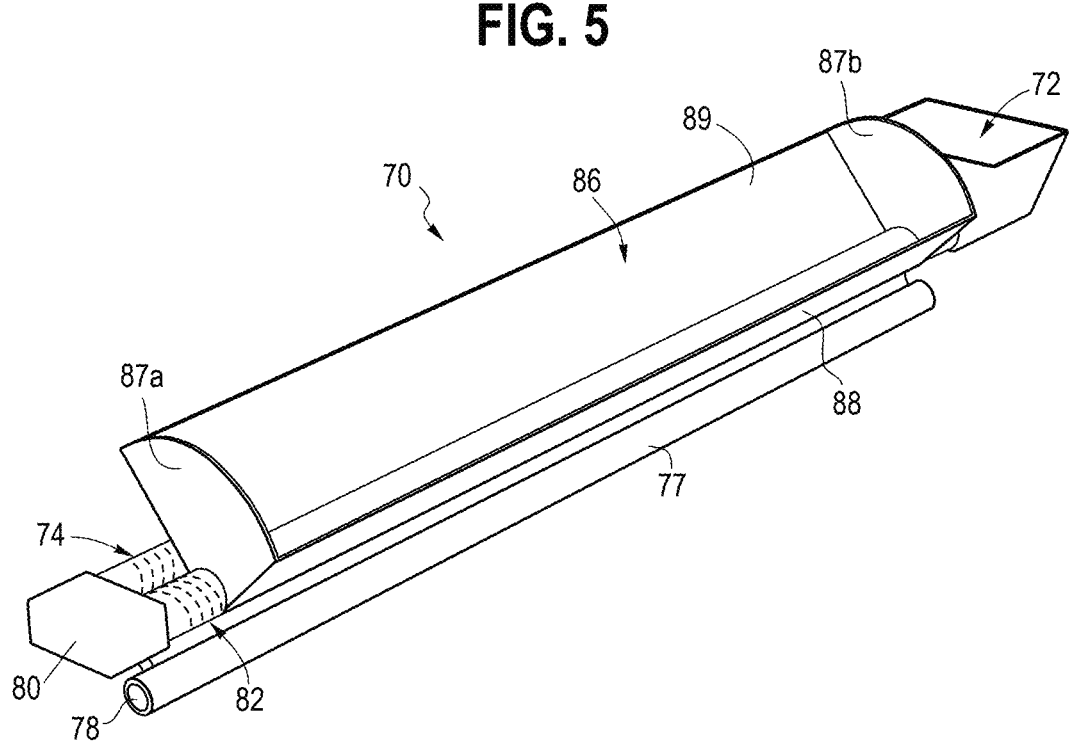
FIG. 5 is a perspective view of an arrangement of hoppers and auger systems that are suitable for use with the present embodiments.

Referring now to FIG. 5, the system 10 may further comprise an arrangement 70 of hoppers and auger systems, which for illustrative purposes are shown isolated from other components of the system 10. Notably, the one or more drums 32 are omitted from FIG. 5 to better depict the hoppers and auger systems, but the one or more drums 32 will encircle various parts of FIG. 5 as depicted in the assembled system view of FIG. 1.

In FIG. 5, one exemplary arrangement comprises a supply hopper 72, which holds toppings that may be furnished to the system 10 from an external supply source. A first auger system 74, also referred to as a supply auger, moves toppings in a first direction from the supply hopper 72 towards a mandrel tube 77. The first auger system 74 may comprise a generally enclosed tubular housing with an auger therein (partially shown in dashed lines), where the tubular housing is open at the bottom region to allow toppings to be dispensed towards the mandrel tube 77.

Figure 6:
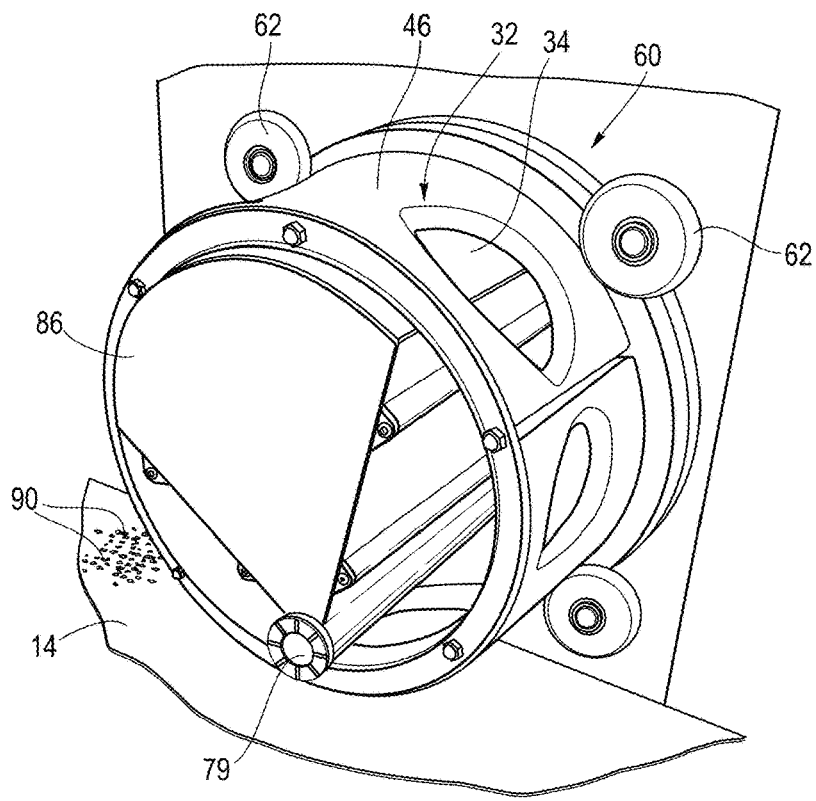
FIGS. 6-8 are perspective views illustrating application of toppings using a single drum in accordance with one embodiment.
Figure 7:
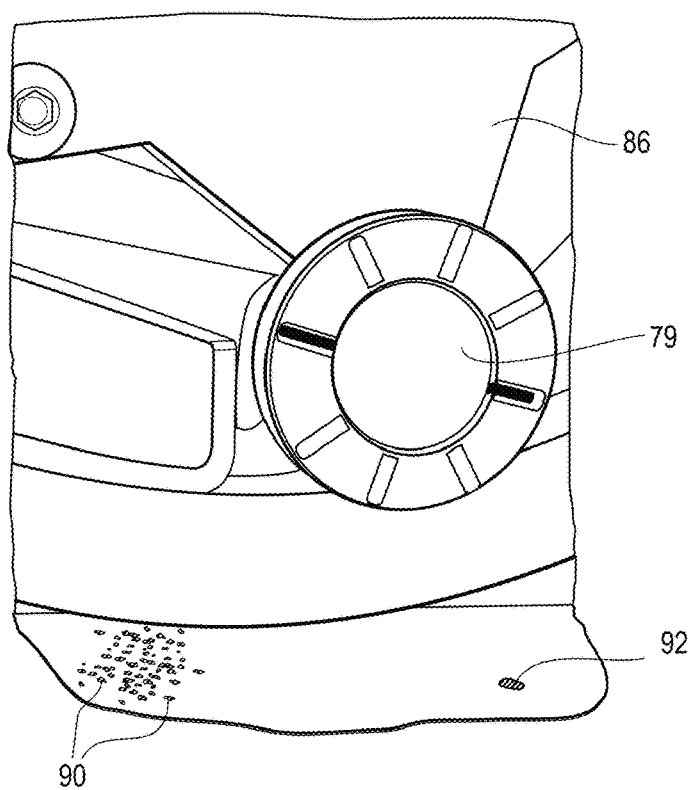

The mandrel tube 77 has a main bore 78 that is dimensioned to house a rotating mandrel 79 (omitted from FIG. 5, but shown in FIGS. 4, 6 and 7). The mandrel tube 77, with rotating mandrel 79 therein, extends laterally above the conveyor belt 14, as shown in FIG. 1, such that during use the rotating mandrel 79 selectively rotates to deposit toppings onto the food product. The rotating mandrel 79 may comprise features, such as molds or indents, that direct the toppings out of the mandrel tube 77 in spaced apart relationships, such as to provide toppings to spaced-apart molds 22a through 22n in the pan 20 passing underneath the mandrel tube 77.

The first auger system 74 further communicates with a return housing 80, which in turn communicates with a second auger system 82, as depicted in FIG. 5. In use, excess toppings that are not supplied to the mandrel tube 77 may be passed by the first auger system 74 into the return housing 80, and then directed by the second auger system 82 in an opposing direction from the return housing 80 towards the supply hopper 72. Notably, augers of the first and second auger systems 74 and 82 are oriented in opposing directions to achieve such directional movement.

The reclaim hopper 86 is disposed between the return housing 80 and the supply hopper 72. The reclaim hopper 86 has a first end 87a closer to the return housing 80, a second end 87b closer to the supply hopper 72, and front and rear walls 88 and 89. The front and rear walls 88 and 89, which extend laterally between the ends 87a and 87b, may be angled relative to a vertical orientation, such that they are wider at the top and narrower at the bottom, as illustrated in FIG. 5.

The one or more drums 32 encircle each of the mandrel tube 77 and the reclaim hopper 86, as best seen in FIG. 1 and FIGS. 6-7 (the drums 32 are omitted in FIG. 5 for illustrative purposes). The angled design of the front and rear walls 88 and 89 is intended to capture excess toppings from the inside of the drum 32, as explained in FIG. 3, and as will be explained further below.

Notably, as shown in FIG. 5, the second auger system 82 passes through a lower region of the reclaim hopper 86. In this manner, the second auger system 82 not only directs toppings originating from the return housing 80 towards the supply hopper 72, but the second auger system 82 further directs additional toppings being introduced into the top opening of the reclaim hopper 86 (which were caught by the interior of the drum 32) towards the supply hopper 72. Although shown as a solid tube in FIG. 5 (with an auger partially shown in dashed lines along a short segment of its entire length), it will be appreciated that the second auger system 82 may be partially or fully exposed such that the auger may be visible to a user.

Figure 8:
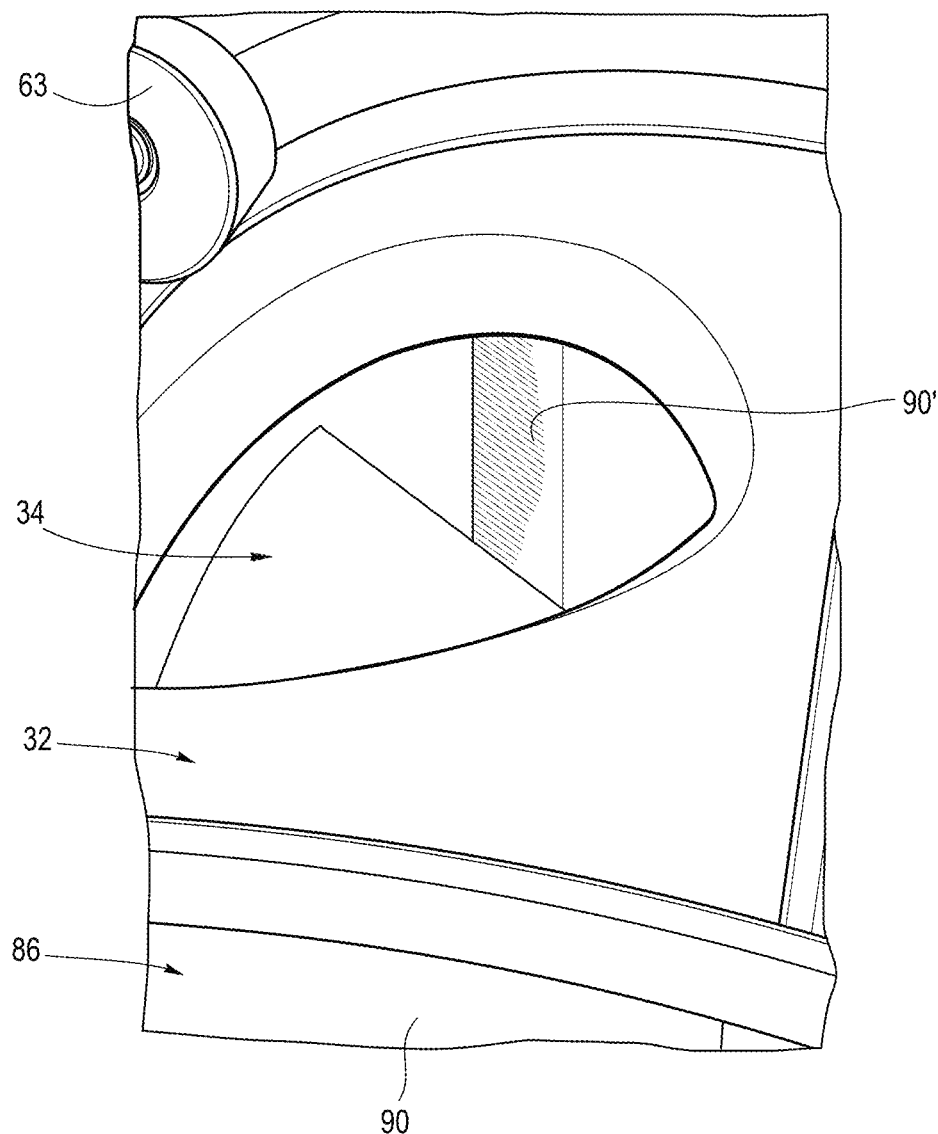

Referring now to FIGS. 6-8, an example of toppings 90 being dispensed, using a system according to the present embodiments, is shown and described.

In a first step, a user may enter one or more commands into a user interface 18 (shown in FIG. 1), for example and without limitation, the pan dimensions, dispense rate (i.e., how much topping to release), and other parameters taking into account features of the product. These user instructions are transmitted, via a microprocessor system, to relevant components of the system 10 to automatically adjust the position of pan guides, the topping quantity to be delivered, the height of the hoppers, and nozzle and mandrel positions. As will be appreciated, additional operator controls, warning systems and control systems may be implemented.

The system 10 may additionally comprise a liquid spray assembly (not shown) having one or more nozzles that are configured to selectively spray water, oil, or other liquid ingredients. The liquid spray assembly may spray the food product before the topping distributor 30 is activated to deposit toppings. In this manner, the food product may be wetted so it may more effectively hold the toppings 90 subsequently released by the topping distributor 30.

A position sensor 92, shown in FIG. 7, is configured to detect the presence of a target point, such as the front edge of the pans 20a, 20b and 20c, or another suitable target passing along the conveyor belt 14. When the target point is identified, the position sensor 92 transmits an instruction to initiate rotation of the mandrel 79, as well as rotate the one or more drums 32 via the frame 50.

During use, the rotating mandrel 79 selectively rotates to deposit toppings toward the food product. As noted above, the rotating mandrel 79 may comprise features, such as molds or indents, that direct the toppings out of the mandrel tube 77 in spaced apart relationships, towards molds 22a through 22n in the pan 20 passing underneath the mandrel tube 77. In this manner, a series of laterally spaced toppings 90 may be dispensed from the mandrel 79; however, such toppings 90 may ordinarily be dispensed into a square or rectangular pattern.

As further explained above, the system 10 applies programmable logic to align the openings 34 of the drum 32 as it rotates with the molds 22 in the pan 20 containing the food product, taking into account parameters including the rotational speed of the drum 32, the dimensions of the openings 34 in the drum, and the dimensions of the molds 22, among other parameters. In effect, the rotating drum 32 acts as a mask to ensure that toppings exiting its openings 34 land primarily on the food product in the molds beneath it, which in this example may comprise a circular food product. On the other hand, the solid regions 46 that are circumferentially between drum openings 34 equate to the solid spaces along pan 20, such as between rows 23 and 24 (along axis L), i.e., where topping is not intended.

Figure 9:
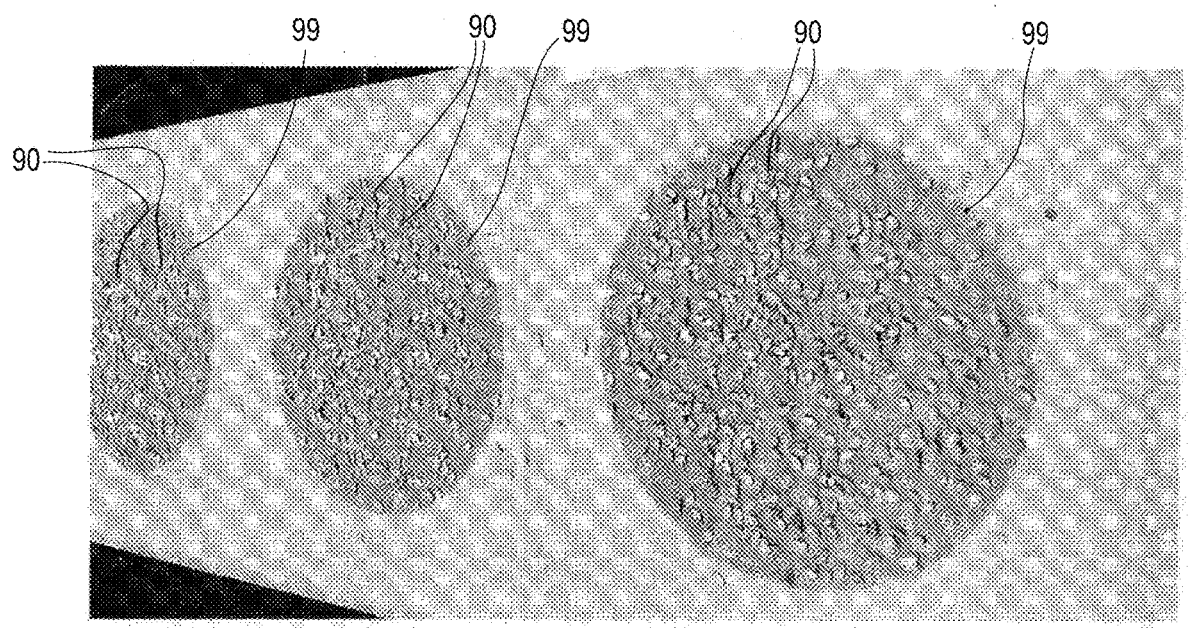
FIG. 9 is a top view illustrating toppings that were sequentially dispensed in a manner closely matching a circular pattern.

In this manner, the openings 34 of the drum 32 are configured to reorient, mask or filter the toppings 90 into a desired final shape, such as adjusting the substantially square or rectangular shape upon exiting the mandrel 79 into a substantially circular shape upon being filtered through the openings 34 of the drum 32. As noted above, through extensive experimental testing, the inventors have determined that the elliptical shape of the openings 34 may closely correspond to projection into a final circular pattern 99, such as that shown in FIG. 9. It is noted that the elongated rear section of the elliptical shape, as it rotates, may help to smooth the topping placement into more of a circular pattern.

During use, as noted above, the lips 41, the ledges 42a and 42b, and the ledges 44 of the drum 32 may facilitate recapture of toppings 90 that are not dispensed through the openings 34. In particular, toppings 90 caught inside of the drum 32 (which fail to exit through the openings 34) are carried circumferentially upward by the lips and ledges 41, 42 and 44 of the drum 32, and ultimately are dropped by gravity back inside of the reclaim hopper 86. FIG. 8 shows an example where toppings 90' are being dropped by gravity back into the reclaim hopper 86 via the internal lips or ledges of the drum 32. As noted above, such toppings 90' then may be recycled, via the second auger system 82, to the supply hopper 72 for later use.

If different size pan molds are used, such as switching from a 5" diameter pan mold to a 4" diameter pan mold, then the original drums 32 may be switched out by being removed from the frame 50, to the unassembled state shown in FIG. 2. New drums then may be inserted into the frame 50 in the manner described in FIG. 2 above. In the example of switching from a 5" diameter pan mold to a 4" diameter pan mold, the original and new drums may comprise the same length $L_1$ of openings (as measured in FIG. 3), but the width $W_1$ of the openings would be smaller in the new drum due to the smaller pan mold width. When the 5" diameter pan mold is used, the original drum 32 may be rotated at a first speed so that the length $L_1$ of the openings 34 matches the 5" diameter molds as they pass along the conveyor belt 14. If the system switches to using a 4" diameter pan mold instead, then the programmable logic may adjust rotation of the new drum to a second, faster speed so that the same length $L_1$ of the openings 34 better matches the 4" diameter mold. In one testing example, it was concluded that the rotational speed of the drum 32 may be increased between about 10 percent to about 30 percent to transition an effective 5" circular pattern into an effective 4" circular pattern, when the same length $L_1$ of the openings 34 is used in the original and new drums. The system may incorporate relatively smooth, or non-abrupt, speed changes in order to reduce any disruption in returning the excess toppings 90 to the reclaim hopper 86.

Advantageously, as explained above, the system 10 provides for improved accuracy when placing toppings 90 on food product passing beneath, and particularly when it may be desirable to place the toppings in a substantially circular shape. However, it will be appreciated that the drum 32 and openings 34 may be varied to be configured to dispense or filter toppings in other shapes than circular, without departing from the spirit of the present embodiments.

As another advantage, noted above, recapture of the toppings 90 is facilitated by the one or more rotating drums 32, and particularly the provision of the inner lips and ledges. In addition to generally being able to recapture toppings 90, the recapture occurs in a highly sanitary manner, specifically without the toppings hitting the pan or mixing with oils or other products.

As yet another advantage, the one or more drums 32 of the present embodiments remain stationary along the longitudinal axis L of the system. Since the drums 32 do not travel axially relative to the conveyor belt 14, they do not need to be returned to a starting point. Therefore, time savings and production rates are improved, without having to stop movement of pans 20a, 20b and 20c traveling along the conveyor belt. As a further advantage, a smaller facility footprint is needed given the omission of axial travel of the topping distributor 30, which may enable usage in smaller bakeries or other environments.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system for placing toppings on a product, the system comprising:
   a mandrel configured to dispense toppings from a supply hopper;
   a topping distributor disposed at least partly downstream to the mandrel, the topping distributor comprising at least one opening; and
   a reclaim hopper, wherein at least some of the toppings that fail to exit through the at least one opening of the topping distributor are directed into the reclaim hopper.

2. The system of claim 1, wherein topping distributor comprises at least one rotating drum that encircles the mandrel, wherein the at least one opening is in the rotating drum.

3. The system of claim 2, wherein the drum comprises at least one interior-facing protrusion dimensioned to catch toppings that fail to exit through the at least one opening, wherein upon rotation of the drum the at least one interior-facing protrusion directs the toppings into the reclaim hopper.

4. The system of claim 1, wherein the reclaim hopper is in communication with the supply hopper, such that the toppings that fail to exit through the at least one opening travel from the reclaim hopper back to the supply hopper.

5. The system of claim 4, further comprising first and second auger systems, where the first auger system directs toppings from the supply hopper to the mandrel, and the second auger system directs toppings from the reclaim hopper to the supply hopper.

6. The system of claim 1, wherein the at least one opening comprises an elliptical shape.

7. A method for placing toppings on a product, the method comprising:
   dispensing toppings from a supply hopper through a mandrel in a direction towards the product;
   masking at least some of the toppings using a topping distributor comprising at least one opening, wherein some of the toppings exit through the at least one opening towards the product, and other toppings fail to exit through the at least one opening; and
   wherein at least some of the toppings that fail to exit through the at least one opening of the topping distributor are directed into a reclaim hopper.

8. The method of claim 7, wherein the reclaim hopper is in communication with the supply hopper, such that the toppings that fail to exit through the at least one opening travel from the reclaim hopper back to the supply hopper.

9. The method of claim 7, wherein topping distributor comprises at least one rotating drum that encircles the mandrel.

10. A system for placing toppings on a product, the system comprising: a mandrel configured to dispense toppings from a supply hopper; and a rotating drum disposed around the mandrel, wherein the drum comprises at least one opening through which at least some toppings exit after being dispensed from the mandrel, and wherein toppings that fail to exit through the at least one opening are directed into a reclaim hopper.

11. The system of claim 10, wherein the reclaim hopper is in communication with the supply hopper, such that the toppings that fail to exit through the at least one opening travel from the reclaim hopper back to the supply hopper.

12. The system of claim 10, further comprising first and second auger systems, where the first auger system directs toppings from the supply hopper to the mandrel, and the second auger system directs toppings from the reclaim hopper to the supply hopper.

13. The system of claim 10, wherein the drum comprises at least one interior-facing protrusion dimensioned to catch toppings that fail to exit through the at least one opening, wherein upon rotation of the drum the at least one interior-facing protrusion directs the toppings into the reclaim hopper.

14. The system of claim 13, wherein the at least one interior-facing protrusion comprises one of an inwardly extending lip surrounding the opening, inward ledges extending from opposing sides of the opening towards the lateral boundaries of the drum, or a lateral ledge formed circumferentially in-between adjacent openings of the drum.

15. The system of claim 10, wherein the drum encircles the reclaim hopper.

16. The system of claim 10, wherein the at least one opening of the drum comprises an elliptical shape.

17. The system of claim 10, wherein the at least one opening comprises between about two to about twelve openings around a perimeter in the drum.

18. The system of claim 17, wherein a first opening in the drum corresponds to a first mold in a first row of a pan holding the product, and a second opening in the drum corresponds to a second mold in a second row of the pan.

19. The system of claim 18, wherein the drum is configured to rotate at a first speed when the first mold comprises a first dimension, and the drum is configured to rotate at a second speed when a different mold comprises a second dimension smaller than the first dimension, wherein the second speed is greater than the first speed.

20. The system of claim 10, further comprising a frame dimensioned to holds multiple adjacent drums, wherein driven rotation of the frame causes rotation of each of the adjacent drums.

* * * * *